US010872368B2

(12) United States Patent
Callanta et al.

(10) Patent No.: US 10,872,368 B2
(45) Date of Patent: Dec. 22, 2020

(54) SYSTEM AND METHOD FOR BROWSING A PRODUCT CATALOG AND FOR DYNAMICALLY GENERATED PRODUCT PATHS

(71) Applicant: McMaster-Carr Supply Company, Elmhurst, IL (US)

(72) Inventors: Ben Callanta, Elmhurst, IL (US); Hui Kang, Oak Park, IL (US); Charleston Noble, Chicago, IL (US); Eric Olson, Chicago, IL (US); Tom Sherman, Chicago, IL (US); Alison Tisza, Chicago, IL (US)

(73) Assignee: McMaster-Carr Supply Company, Elmhurst, IL (US)

( * ) Notice: Subject to any disclaimer, the term of this patent is extended or adjusted under 35 U.S.C. 154(b) by 316 days.

(21) Appl. No.: 15/829,327

(22) Filed: Dec. 1, 2017

(65) Prior Publication Data

US 2018/0082347 A1    Mar. 22, 2018

Related U.S. Application Data

(63) Continuation of application No. 14/201,195, filed on Mar. 7, 2014, now Pat. No. 9,870,582.

(60) Provisional application No. 61/782,898, filed on Mar. 14, 2013.

(51) Int. Cl.
*G06Q 30/00* (2012.01)
*G06Q 30/06* (2012.01)

(52) U.S. Cl.
CPC .............................. *G06Q 30/0623* (2013.01)

(58) Field of Classification Search
CPC ...................................................... G06Q 30/00
See application file for complete search history.

(56) References Cited

U.S. PATENT DOCUMENTS

| 8,010,571 | B2 | 8/2011 | Knoblock et al. |
| 8,245,150 | B2 | 8/2012 | Katter, Jr. et al. |
| 8,249,885 | B2 | 8/2012 | Berkowitz et al. |
| 8,296,291 | B1 | 10/2012 | Desjardins |
| 8,549,407 | B2 * | 10/2013 | O'Neil Garcia ....... G06Q 30/08 715/738 |
| 8,612,418 | B2 | 12/2013 | Civelli et al. |
| 9,164,653 | B2 * | 10/2015 | Keondjian ............ G06F 3/0484 |
| 9,489,400 | B1 * | 11/2016 | Haitani ................. G06F 16/583 |
| 9,792,638 | B2 * | 10/2017 | Liu ........................ G06Q 30/02 |
| 10,534,511 | B2 * | 1/2020 | Garcia .................. G06Q 30/08 |
| 2002/0032699 | A1 | 3/2002 | Edwards et al. |
| 2002/0143896 | A1 | 10/2002 | Hansmann et al. |
| 2002/0147788 | A1 | 10/2002 | Nguyen |

(Continued)

OTHER PUBLICATIONS

McAuley, Julian, "Inferring Networks of Substititable and Complementary Products", Cseweb.ucsd.edu, dated Aug 11, 2011. (Year: 2011).*

(Continued)

*Primary Examiner* — Mark A Fadok
(74) *Attorney, Agent, or Firm* — Schiff Hardin LLP

(57) ABSTRACT

A computer device such as a tablet computer accesses a server to search a product catalog. The catalog is displayed as a broad classifications of products, which when selected result in the display of sub-classifications within the classification. Levels of searching are provided to the product level, and movement within each level is possible.

41 Claims, 15 Drawing Sheets

(56) References Cited

U.S. PATENT DOCUMENTS

| | | |
|---|---|---|
| 2004/0021682 A1 | 2/2004 | Pryor |
| 2004/0049541 A1 | 3/2004 | Swahn |
| 2004/0148232 A1 | 7/2004 | Fushimi et al. |
| 2005/0154651 A1 | 7/2005 | Bezos et al. |
| 2005/0256785 A1 | 11/2005 | Entwistle et al. |
| 2006/0229757 A1 | 10/2006 | Minami et al. |
| 2007/0147787 A1 | 6/2007 | Ogawa et al. |
| 2007/0226189 A1 | 9/2007 | Piekos et al. |
| 2008/0086687 A1* | 4/2008 | Sakai .................. G06F 3/04812 715/716 |
| 2009/0150791 A1* | 6/2009 | Garcia .................. G06F 3/0484 715/738 |
| 2009/0254455 A1 | 10/2009 | Rothey et al. |
| 2009/0276488 A1 | 11/2009 | Alstad |
| 2010/0262514 A1 | 10/2010 | Westphal |
| 2011/0184972 A1 | 7/2011 | Ard et al. |
| 2011/0193881 A1 | 8/2011 | Rydenhag |
| 2012/0078731 A1 | 3/2012 | Linevsky et al. |
| 2012/0123865 A1 | 5/2012 | Salzano |
| 2012/0209715 A1 | 8/2012 | Lotan et al. |
| 2012/0254775 A1 | 10/2012 | Hsieh et al. |
| 2012/0265744 A1 | 10/2012 | Berkowitz et al. |
| 2012/0290447 A1 | 11/2012 | Hershenson |
| 2013/0019159 A1 | 1/2013 | Civelli et al. |
| 2013/0054652 A1 | 2/2013 | Antonelli et al. |
| 2013/0066745 A1 | 3/2013 | de Heer et al. |
| 2013/0124980 A1 | 5/2013 | Hudson et al. |
| 2013/0127737 A1 | 5/2013 | Shneidman |
| 2013/0145319 A1 | 6/2013 | Wein et al. |
| 2013/0185642 A1 | 7/2013 | Gammons |
| 2013/0227441 A1* | 8/2013 | Cockcroft ............. G06F 3/0485 715/760 |
| 2014/0063056 A1 | 3/2014 | Zhong |
| 2014/0100997 A1 | 4/2014 | Mayerle et al. |
| 2014/0354695 A1 | 12/2014 | Sakai |
| 2015/0193395 A1 | 7/2015 | Nicolaou et al. |

OTHER PUBLICATIONS

Patrick—Touch Screen Product Catalog for Retail Store, 1 page, May 2010.

Showmetheparts1, http/showmetheparts.com/html/mobilelanding, retrieved from Waybackmachine filed Mar. 2, 2013 (Year: 2013).

Showmetheparts2, ShowMeTheParts-Mobile: It's the game-changer for parts look up technology, pulled from the webpage Showmetheparts1; dated Mar. 2, 2013 (Year: 2013).

* cited by examiner

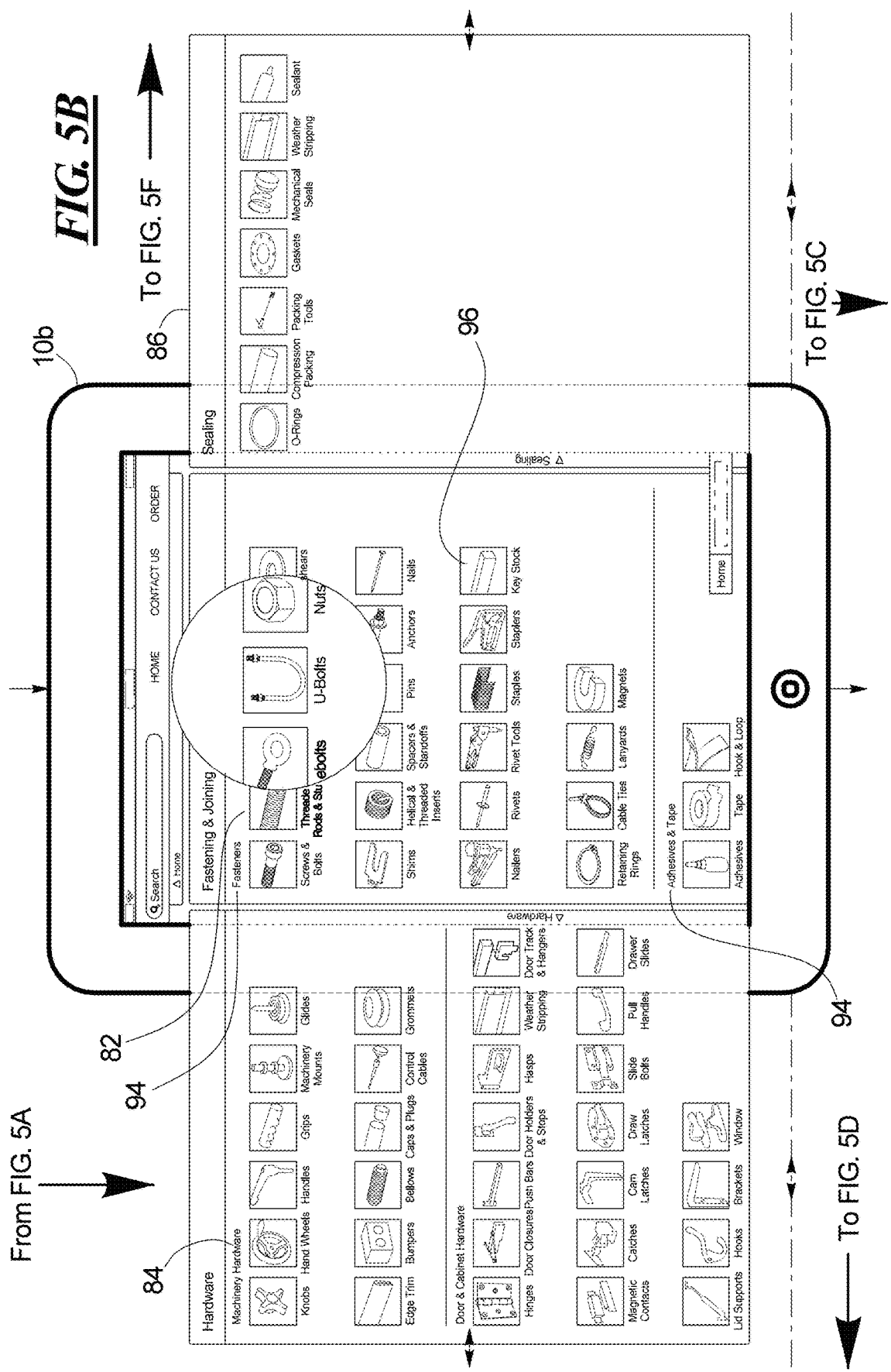

← From FIG. 5C

Screws
- Socket Cap Screws
- Cap Screws
- Machine Screws
- Set Screws
- Shoulder Screws
- Tapping, Wood, and Drywall Screws
- Thumb Screws
- Captive Fasteners
- Binding Post
- Screw Nails
- Hex Standoffs

Bolts
- Bolts
- Anchor Bolts
- Concrete Bolt Anchors
- Hanger Bolts
- Machine Table Bolts
- T-Handle Bolts Threaded Rods and Studs

FIG. 5F

SYSTEM AND METHOD FOR BROWSING A PRODUCT CATALOG AND FOR DYNAMICALLY GENERATED PRODUCT PATHS

CROSS-REFERENCE TO RELATED APPLICATIONS

This application is a continuation application of co-pending U.S. patent application Ser. No. 14/201,195, filed Mar. 7, 2014, which is incorporated herein by reference.

This application claims the benefit of U.S. Provisional Patent Application Ser. No. 61/782,898 filed Mar. 14, 2013, which is incorporated herein by reference.

BACKGROUND

Field

The present invention relates generally to a system and method for providing access to product information via a user interface of a computer device and, more particularly, to a method for browsing a product catalog.

Description of the Related Art

Product catalogs for some companies include an extensive listing of items. These product catalogs are now commonly being made available on-line. A user searching for an item in an electronic or on-line catalog may have a daunting number of pages to review before locating an item of interest. Searching for several items may take a considerable amount of time. One search tool that may be used to locate an item in a catalog is key word searching. However, key word searching may not be effective at locating the desired item or at presenting a limited number of pages to be reviewed. This is particularly the case if the user makes a poor choice of key words for the search or if the product description shares descriptor words with a large number of other products in the catalog. A keyword search may also result in returning a result with very many items, of which only a few or even none are the desired items.

A hardware catalog is an example of an on-line product catalog in which searching for a product may become time consuming. A user looking for a particular bolt, for instance, may input the search term "bolt." However, that search form may retrieve a huge number of possible items that fit this description. This is the case because the search response returns bolts of many different lengths, many different thread configurations, many different head configurations, many different materials, and the like. Causing further frustrating to the user, the desired item may instead be classified in the catalog as a screw, another product description category including a large number of possible items. Similar issues may also arise when searching for other items in a sizeable catalog. Of course, catalogs for other types of items may include large numbers of products to review as well.

SUMMARY

The present invention provides a system and method for guiding a user to a desired product listing in an on-line catalog by utilizing product paths. The system and method includes a user interface program or application (also referred to as an "app") operating on a computer device, such as a computer device having a touch screen display or other input device that the user may utilize to input commands to the system. The input commands to initiate and progress through a product search may include a tap, a touch, a swipe or a pinch, a voice command, or may include a typed or a handwriting input, or other types of input to enable a user to enter commands to the system. User input may be provided to the system by other means as well, including by a keyboard, mouse, pointing device, touch or touchless gesture sensor, or other input device.

As a component of the product paths, path indictors which serve as clues or guides may be displayed on the user interface screen to provide guiding directions to the user. The path indicators or guides indicate to the user what information may be displayed on a next screen in response to a user input such as a user input via the touch-screen display. The path indicators or guides may include directions to the user such as information directing a user input to change the display to show the next screen. For example, the direction information may indicate that a swipe command may be entered using the touch screen display. In certain embodiments, more than one path indicator or guide is shown on the user interface screen with a corresponding number of directions information. Multiple directions indicated by the direction information corresponds to branching of the possible product paths.

The product paths work within a product search structure. The product search structure may include product groupings, identification of related products, product families, learning about products, updating of product paths or product relationships, multiple information levels, and display of possible display screens using path indicators among other things.

The information or display screens that may be shown as possible next user choices may be defined by product paths or product pathways. The product paths may utilize product detail levels, product groupings, and product associations. Multiple possible next information screens may be defined, and multiple possible directions may be indicated on the user interface. The displayed path indicators or guides on the user interface screen provide the user with the direction information to enable the user to select from the multiple possible input directions so as to guide the user to the desired product information, for example along a product path.

The present system and method quickly guides a user from a displayed screen encompassing a very large number of products to a display screen showing a relatively small number of products, or even to a display screen that shows only a single product having the characteristics for which the user is searching. More specifically, the user is guided between display screens of one or multiple product categories that encompass many products and display screens of product information on one product or specific products. The user may use the path indicators or guides to move from a display screen showing a single or only a few products to a display screen showing a greater number of products, such as in one or more product categories. The user may use the path indicators or guides to move to display screens at a similar level of product detail or grouping.

The display of path indicators or guides having information on possible next displayed information screens as well as direction indicators associated with the possible next displayed information enables the user to access the desired information more directly and with fewer intervening screens being opened and examined by the user than would be required by a sequential review of the screens of the product catalog. The path by which the user reaches the desired product information may be referred to as a product path.

The system and method of certain embodiments is configured to direct the user along a product path that reduces the intervening screens that must be viewed by the user to reach the desired product. The system and method of certain embodiments learns product path information from the user and from other users so that product paths may be shortened and/or optimized.

The method and system in one embodiment provide the user with the ability to move from any displayed page or screen in a product catalog to a display of any other page or screen of the catalog by moving through, or sequentially displaying, one or more pages, which may be related pages. A user moves from page to page (screen to screen) of displayed information with an input, such as a gesture input via the touch screen display device. The gesture input may include a directional component, which results in the system accessing and displaying next display information in accordance with the directional component of the gesture.

The possible next display information may be grouped into multiple levels. The using input may display next information within a level, display next information above the current displayed level or display next information below the current displayed level. The path indicators, which may be referred to as clues or guides, on the user interface indicate next information within a level, above the displayed level, and below the displayed level. The depth or quantity of information shown on any given page or screen about a product is a function of the level that is being displayed. In certain embodiments, similar levels of product details for each product are displayed within a same level. In certain embodiments, more information about a product is displayed at lower levels and less information about a product is displayed at higher levels. The conventions of higher or lower levels are not limiting to the scope of the invention. Higher levels may have greater detail and lower levels may have less product detail. Other level indicators may be used as well.

In certain embodiments, the user moves from displayed page or screen to displayed page or screen by making a swiping motion on the touch screen and the display responds by giving the appearance of the displayed pages or screens moving to the left or right. In certain embodiments, the right and left swipes bring the user to other pages or screens at the same level, such as pages or screens having a same level of detail. A tap or other selection input on an icon or symbol on the displayed page by the user causes the display of a lower, more detailed level of the catalog. The information displayed may be represented by the icon or symbol selected by the user. Left or right swipes on the touch screen display at the deeper level by the user causes the system to respond by displaying pages at the deeper, more detailed level.

User input such as a vertical swipe on the touch screen display in certain embodiments results in the display or information at a higher, more general level. An entire product catalog may be browsed at any level using left or right swipes on the touch screen display to move to next displayed information at that level. A difference between browsing at a lower, more detailed level compared to browsing at a higher, more general level is that the number of left or right swipes required to be input by the user may be greater at the lower, more detailed level and fewer at the higher, more general level. A user may readily move between levels to reduce a number of inputs required to reach a desired product information page or level.

The user input on the touch screen may be monitored to determine if an optimum product path has been provided and may be used to improve product paths.

BRIEF DESCRIPTION OF THE DRAWINGS

FIGS. 5A, 5B, 5C, 5D, 5E, 5F, and 5G are portions of a schematic representation of displayed information resulting from user interaction with the user interface of the touch screen computer device.

DETAILED DESCRIPTION

Figure 1:
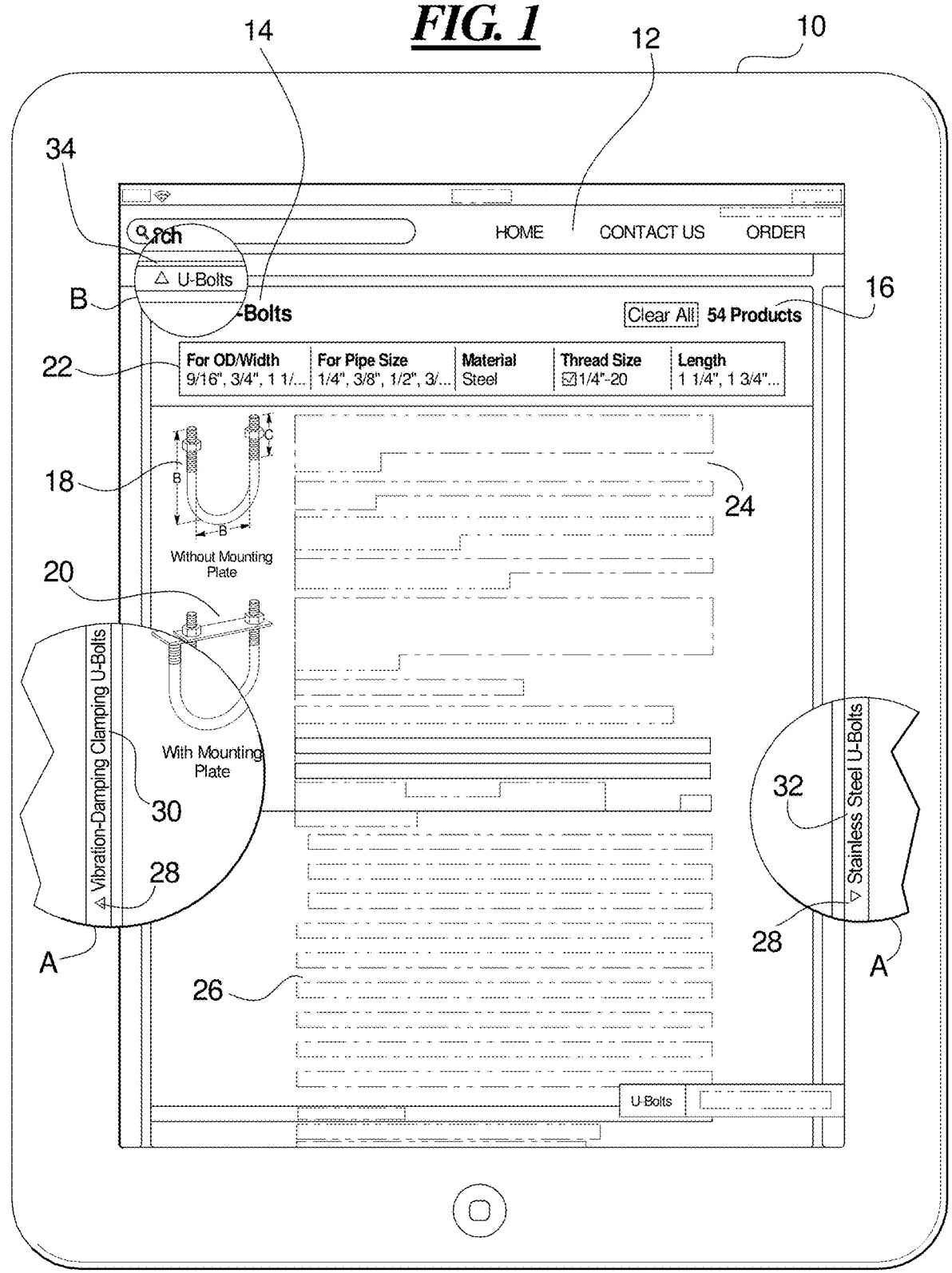
FIG. 1 is a screen shot of a user interface on a touch screen computer device showing an example of a search screen for a product. The screen shot includes magnified portions of the display.

Referring first to FIG. 1, a user who wishes to locate a desired item or product in an on-line product catalog, in this example, accesses the product catalog using a portable electronic device such as a tablet computer 10 or other touch screen computer device. The tablet computer 10 of the illustrated example is an Apple iPad tablet computer, although other tablet computers and other computer devices such as laptop computers, notebook computers, netbook computers, electronic readers, desktop computers, workstation computers, PDAs (personal digital assistants), smart phones, or the like may be used to access the on-line catalog. In the example, the electronic device or computer device includes a display having a touch sensitive screen by which a user may input information and commands to the electronic device and by which the user may interact with the displayed information. The tablet computer or other computer device may be referred to as a mobile device, although stationary computer devices may be used as well within the scope of this invention.

The tablet computer 10 includes a touch screen display 12 on which is shown a user interface screen that includes data transmitted to the tablet computer 10 by a server over a network connection. The network connection may be a wired or wireless connection such as a Wi-Fi wireless communication channel or cellular telephone communication channel or connection or other wireless LAN, Bluetooth, Ethernet, or other wired LAN, WAN or network. The network may include the internet and/or another network. Any means for transmitting data between the mobile device and a server or other computer device is within the scope of this invention.

On the display 12 of the tablet computer 10 is shown a product information page or display screen depicting a product or product family available from a supplier or company. The user of the tablet computer 10 has reached the product information page using search tools, possibly including search tools to be discussed hereinafter. The product information page encompasses a family of products. In the illustrated example, the product family includes steel U-bolts. A description 14 of the product family is shown at the top left of the display and the number of items within the family is shown at 16. In the illustrated example, 54 products are within the displayed product family. On the displayed page or screen is shown a picture 18 that represents the product family and that is marked to indicate variables in dimensions or characteristics that may be used to specify particular products within the product family. The picture 18 may show a specific product within the product family as a representative example, or may be a generic representation of the family. In the illustrated example, the illustration of a sample steel U-bolt is marked to show that the variables within the selected product family include overall length of the bolt, width of the bolt, and length of the threaded portion of the U-bolt. A user desiring a steel U-bolt of a certain length, width, and length of the threaded portion may examine the steel U-bolt products available on the displayed product family information page or screen and locate the product that has the desired values of the variables, and thereby obtain the desired U-bolt.

Each product family has a representative picture. Usually these representative pictures for different product families will be different and the variables in the characteristics within the product family will be different. It is also possible that the same or similar pictures may be used for different product families.

A second illustration 20 on the product screen or page shows an example of an application of a product in the product family or an accessory that is commonly used with a product in the product family. In the example, a mounting plate is shown mounted on the U-bolt in the illustration 20 to show a possible use of the U-bolt and to indicate to the user that mounting plates may be available via the catalog or otherwise.

The displayed page includes a banner 22 across the top of the screen that shows the range of variable values or product characteristics that are available within the illustrated family. In the illustrated example, the variables include a range of values for the width of the U-bolt, a range of values of pipe sizes on which the U-bolts may be used, one or more materials of which the U-bolt may be made, the range of thread sizes of the threaded portion of the U-bolt, and the range of lengths of the available U-bolts. This potentially important information is presented in a location and style so that it is readily seen by the user, such as across the top of the page in an easy to see and find format.

The information provided on the banner 22 may extend off screen if it includes more information than will fit into the on-screen portion of the banner. The off-screen information may be accessed by the user performing a finger swipe or finger drag on the touch screen display over the banner to bring the off-screen portion onto the display screen. Other means for displaying more information than may appear on the screen may be provided as well or instead. Detailed information 24 including product attributes and a product description may be presented below the banner 22. The detailed information or attributes 24 may be information the user may wish to know about the products in the product family if the user determines that the basic information in the banner 22 describes products that are applicable to the user's needs. Here, the detailed information or attributes indicates that the steel U-bolts of the selected product family are available in a variety of finishes, with or without a mounting plate, and that each steel U-bolt is provided with hex nuts.

To access products that have a listed attribute, the user touches the portion of the display screen over the displayed attribute, which opens a page or screen of display information or moves the displayed information to a more detailed product listing for products having the selected attribute. Details are provided on the types of finishes, such as zinc-plated finish, black oxide finish, and galvanized finish in the illustrated example. Below the detailed information 24 is a listing 26 of part numbers of products having the indicated characteristics along with their specifications and price. The parts listing 26 in this example begins with zinc-plated steel U-bolts in various sizes, below which is shown black oxide coated steel U-bolts. The part numbers listing 26 continues off-screen; the off-screen portion may be accessed by the user with a finger motion on the touch screen to scroll the displayed information to reveal the off-screen portions of the information.

A feature of the product display 12 is path indicators 28, which are shown magnified in this view. The path indicators or guides 28 show that a left or right path, also referred to as a horizontal path or same level path, is available to either the left or the right of the displayed information. The horizontal path indicators or same level path indicators 28 show that by a left or right generally horizontal finger swipe on the touch screen 12, the user may move the display to another page or screen that shows products that may generally be at the same level within the product search structure. The left or right swiping may be referred to as horizontal gesture browsing. The horizontal or same level path indicators direct the user to information on closely related products. The horizontal or same level path indicators also describe the information that is available if the user performs the same level path command, such as by identifying the information by a brief name or description. In the illustrated display of the steel U-bolts information page 12, the left path indicator 30 shows vibration damping clamping U-bolts as a closely related product family at that same level, whereas the right path indicator 32 shows stainless steel U-bolts as a closely related product family at the same level. An input by the user of the left or right level command, such as by swiping, will result in the display changing to show the product family in the right path indicator or the left path indicator, respectively.

In certain embodiments, the information content of the pages for the related products that are immediately adjacent the displayed page and that are represented as horizontal path indicators 28 are retrieved in advance of receipt of a horizontal command from the user. The selection of one of the displaying the paths by the user thereby quickly displays the already retrieved information. The user need only swipe a finger from the left to the right or from the right to the left on the touch screen to immediately see the next adjacent screen of related products. For example, a swipe from the left to the right will move the current screen to an off screen position to the right and display the screen that is presented at the left of the current screen. A swipe from the right to the left will move the current screen to an off screen position to the left and reveal the related products screen that was available to the right.

When the next screen is displayed by a left or right swipe, the method and system provides that the information of the previously displayed screen is stored temporarily for rapid retrieval. Thus, information of a screen that is next to what is now the displayed screen (i.e., following the swipe) is retrieved in anticipation of being displayed if the user inputs a command to display the new next screen information.

The information that is provided as next screen information to which the user may move the display as a next screen is typically information about a closely related product or product family. However, the next screen information that is presented to the user when viewing a specific screen may be changed dynamically by the system and method. The change in what information is determined to be next screen information may depend on input by this user, for example during this search or other searches, or input by other users for this product family or other product families, or input by an administrator, for example. The product paths and the product search structure may thereby change in a dynamic way.

The display 12 also shows a vertical path indicator 34 that indicates to the user that a vertical swipe on the touch screen may return the display to a higher or less detailed level in the product path or product search structure. The product search structure may include the collected product paths of searches for multiple products within the product catalog. The vertical swipe to move to the higher level may be referred to as vertical gesture browsing. Here, the prior screen in the product path is the more general category of U-bolts, whereas the more detailed level screen shown in this view relates to the more specific product family of steel U-bolts. Vertical gesture browsing also includes input of user commands to move the display to a more detailed level, such as by tapping on an icon or other display element to cause the display of a deeper level within the product search structure. The user may use horizontal gesture browsing (left or right swiping) within that deeper level or may use vertical gesture browsing to return to the previous level. A combination of vertical gesture browsing and horizontal gesture browsing within the product search structure, and along the product paths, permits the user to move quickly to product information for a desired product and to then move quickly to other desired products.

In certain embodiments, closely related products are available for viewing by the user immediately by simple swipe motions on the touch screen. The system is responsive to the swipe motions because the display data for the related products in certain embodiments is prepared for display before the path indicators are shown on the display. Further detail on how the related products are determined is disclosed hereinafter. The touch screen activation of the different screens is a preferred method of moving about the product paths of the search structure, although a touch pad, joystick, mouse, keypad, or other input means may be used instead.

Figure 2:
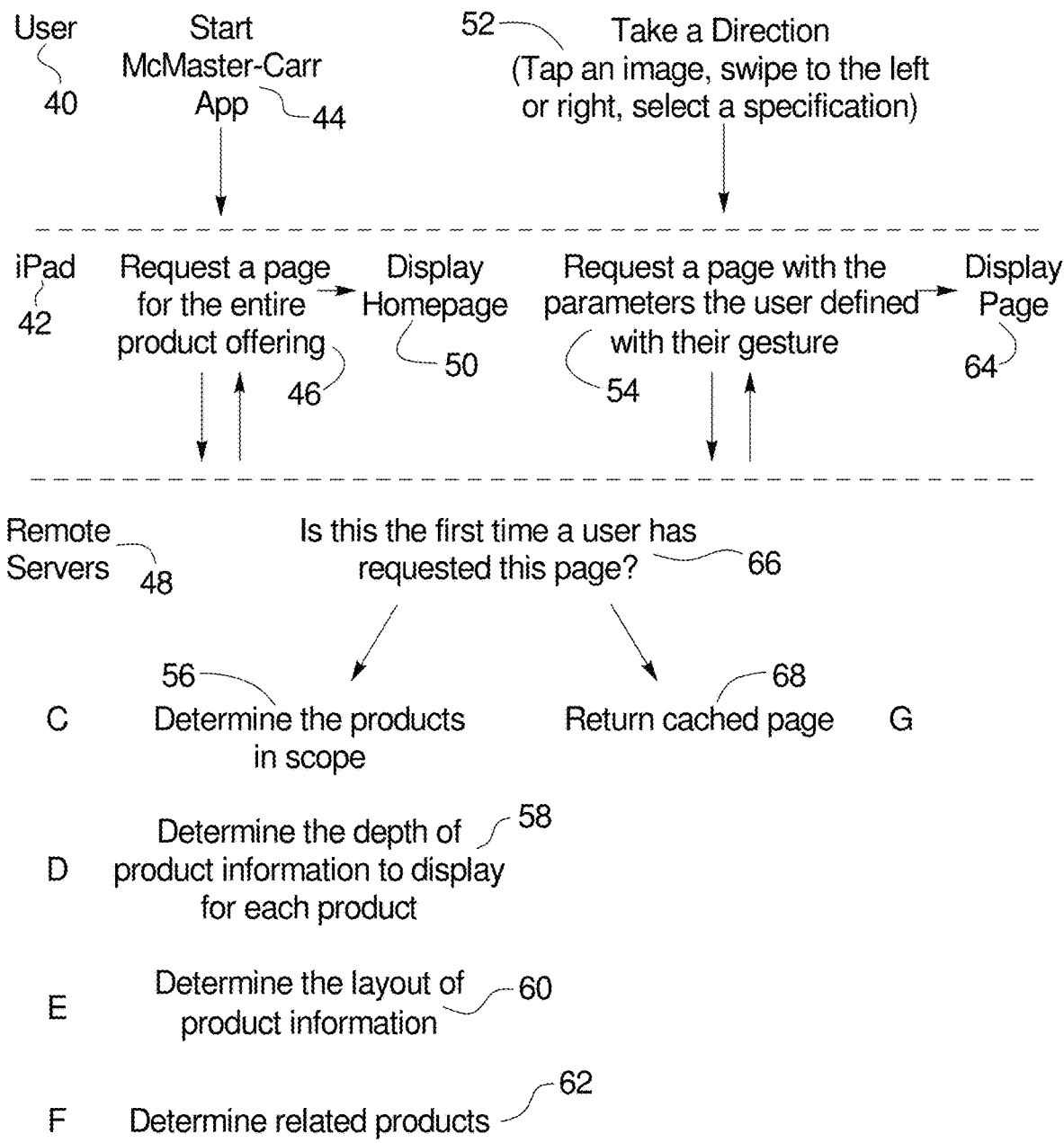
FIG. 2 is a flow chart showing the interaction between a user, a portable device and a remote server according to the principles of the present invention.

Turning to FIG. 2, a user 40 has a mobile device or other computer device 42 on which an application, or app, 44 is installed or otherwise available for execution. The user starts the app 42 such as by tapping the icon for the app 44. The mobile device or computer device 42 sends a request for a page or screen for the product offering 46 to one or more remote servers 48. The servers 48 return data and display a homepage screen 50. The user 40 provides input to the device 42 to take the search in a direction, as shown at, 52. The user input may be a tap on an image, a swipe to the left, right, up, or down, a keyword search, a specification or characteristic search, or other input.

At 54, the computer device 42 requests a page with the parameters that the user indicated by the gesture. The request for the page or screen information is sent to the servers 48. The servers determine the products that are within the scope of the requested page or screen, at 56. The servers determine the depth of the product information to display for each product, at 58. The servers then determine the layout of the product information, at 60. The content of the displayed information may be determined based on input received by the servers as to the characteristics of the display on the computer device or mobile device 42, for example, the size and resolution of the display device. The servers also determine the related products, at 62, which may be indicated as next screen information. Product path information or guide information is generated for indicating to the user the next screen information that may be displayed upon user input along the product path. This information is returned by the servers 48 to the device 42 for display to the user 40. The user 40 may provide input gestures to further refine the search for the desired product. An objective of the system and method is to display a product information page or screen 64 to the user 40 on the device 42 for the desired product using few intervening screens.

In further detail, the process for finding products is applicable in a computer interface. The user 40 of the interface typically begins a search for products by entering a keyword or tapping on one of the product images presented. The user's tapping or typing triggers a remote call through the Internet to a website or other server. Matching products are rendered on the device. From that point forward, dynamically generated product paths are available to guide the user to the product the user is seeking. The user is shown matching products and paths to closest-related products. Controls assist the user in moving to closest-related products. Paths are generated based on user input in combination with a merchandised flow of products. The path in either direction enables the user to traverse the entire product offering. The change in the display from one set of products to another is reinforced by a series of animations of the products.

In the preferred embodiment, on the left and right margins of the display, the interface screen shows guides or product paths to closely-related products. The closely-related products are identified by a brief name or other descriptor. The contents relevant in radial steps, or horizontal steps, of the product path are retrieved in advance of gestures. The immediacy of movement to closely-related products through a gesture is a significant feature of the method and system. Responsiveness is maximized by retrieving the contents to be presented for the closely-related products before the user indicates their interest in moving left or right. On the top margin of the display, the interface shows the last step in the product path.

At step 56, the servers make a determination to define a set or grouping of products that are within the scope of the search. Each product may have specifications and keywords that describe the product's characteristics and benefits. Authors, possibly using automated algorithms, have prepared descriptions of each product including the specifications and keywords relating to the product. When a user enters a keyword or indicates an interest in a particular specification, the system may find the products that match the search criteria. The input search criteria may be used to identify or generate product paths.

The input by the user may be a search argument (a string of characters that represent the products as to which the user is interested). The input character string is cleansed. This means that punctuation, symbols, and extraneous spaces are removed from the search argument. The search string is tokenized, meaning that the search argument is broken into meaningful segments (i.e., tokens) for lexical analysis. An interpretation is performed; each token is analyzed using computational linguistics techniques for parts of speech, misspellings, synonyms, foreign language, and units of measure to be converted. After these steps, a matching function is performed, wherein an index that has been built in batch offline contains the relationship between tokens and products. Using the results of the interpretation step, the system finds matching products that have least one token in the search argument. A ranking is performed, wherein the more tokens a product matches from a search argument the higher the product's rank. Many products can share the same rank. The output is a ranked list of matching products.

At step 58, a determination is made regarding the depth, or level of detail, of product information to display for each product. The input for this determination is a ranked list of products from the preceding step. The determination takes into account the computer device's viewport (display screen) dimensions (which is obtained by polling the device), the variety and number of products in scope and the amount of the product information (possibly including images, specifications, copy, tables, CAD drawings). The goal is to determine the depth of product information that provides enough information for the user to make quick, confident decisions without being overwhelmed. Too little information forces the user to make uninformed decisions. Too much information takes a lot of time for the user to consume A determination is made of the amount of space available to present the information. Information that is "above the fold"—in other words visible in the first screen—is more likely to be read and used than information "below the fold"—in other words on a second or subsequent screen that may be viewed only after being scrolled to by the user. A determination is made of the size of the display screen of the mobile device or computer device by polling the device and potentially by comparing a product identification or model with a table of stored data that provides the screen size. Given the viewport or display screen size of the user's device, a determination is made as to how much physical space is available for the displayed information.

The server operates to find opportunities to group product information for display. A determination is made of how the ranked list of matching products maps to the taxonomy of the products. When the search results list spans more than one category in the taxonomy, the products are grouped by the categories in the display.

A determination is made by the server as to whether a specification or characteristics search is appropriate. A method for narrowing a set of products is to provide the user with filters to eliminate irrelevant products, in other words, a specification search. The products available in the catalog are classified and grouped in a product taxonomy. Products that come from disparate locations of the product taxonomy usually do not share specifications or characteristics.

The servers search for opportunities to bundle product information for the display on the computer device. A product can be represented by a value pair list of attributes and attribute values. Products that have common attributes and attribute values can be visually combined in the display. Usually this is done in a table that is prepared for display on the display screen. The columns of the table represent the various attributes and the rows in the table are the individual products and their corresponding attribute values. Bundling products for the display screen removes the redundancy in labels that might otherwise be required to display the products.

The servers search for opportunities to summarize product information on the display screen. When the determined amount of space available on the display screen is not large enough to accommodate bundled product information, groups of products can be summarized. Summarizing or groups of products omits detailed information about products in favor of a small footprint on the display.

The output of the step 58 is a ranked list of matching products.

In step 60, a determination is made of the layout of product information to be presented on the display screen of the computer device 42. Given the product information that has been collected and the device's viewport or screen dimensions that have been determined, a layout is created that maximizes density and readability of the displayed information. The input of this step is the bundled and summarized information for a set of products A determination is made of the optimal layout for each product's information on the display screen. Products can be represented by one or more publication elements (an image, captions, footnotes, a copy, and tables). The shape and size of the publication elements can be altered. The system accomplishes the determination of optimal layout by holding a publication element constant and iterating that element through combinations of other elements. Each combination is scored for density and aesthetic appeal.

A determination of the optimal layout for each product's information in the context of all other products is made. There are readability and aesthetic appeal benefits for consistent layouts across products display screens. However, to obtain consistency some products in the displayed information will have suboptimal layouts. The system and method iterates through combinations to get a page that maximizes the desired display characteristics across all products. Each combination is scored.

The output of this step includes x and y coordinate position information for each piece of information or display element to be presented on the display screen of the device.

In step 62, a determination of related products is made. The relevance of alternative and complementary products is evaluated using statistical methods. Titles for the two most closely related families of products, whether alternatives or complements, or both, are chosen. These titles are shown in the left and right path indicators. An input for this step includes the products that are within the scope for the current page.

A determination of alternative and/or related products is made. Product attributes specified by the user in the user's search, along with statistics about searches by other users such as by clusters of similar users, are factored into one or more formulas which evaluate products that are most likely to be suitable alternatives to what the user is currently viewing. A determination of complementary or related products is made by the system using the statistics. The product attributes specified by the user in the search, along with statistics about products that are ordered together by the user and/or by clusters of similar users, are factored into the formula. The formula is used to evaluate products most likely to be suitable alternatives to what the user is currently viewing for generating the next screens in the product path.

The output of the step of determining the alternative or related products is a ranked list of related products. From this information, the servers construct a display page or screen 64 for the user's device and transmit it to the user's computer device for display. The information for display includes the page constructed from the display elements and the path indicators that indicate the complementary or related product information that may be available as next screens. The system and method thereby establishes one or more product paths, such as may comprise a product search structure.

If the user has requested this page before, as determined at step 66, a cached copy of the page may be returned, as indicated at 68, rather than generating a new page or screen. Alternatively, the previously requested page may be updated, for example with different path indicators or guides or other information as learned from the similar users and/or from this user's prior search.

Figure 3:
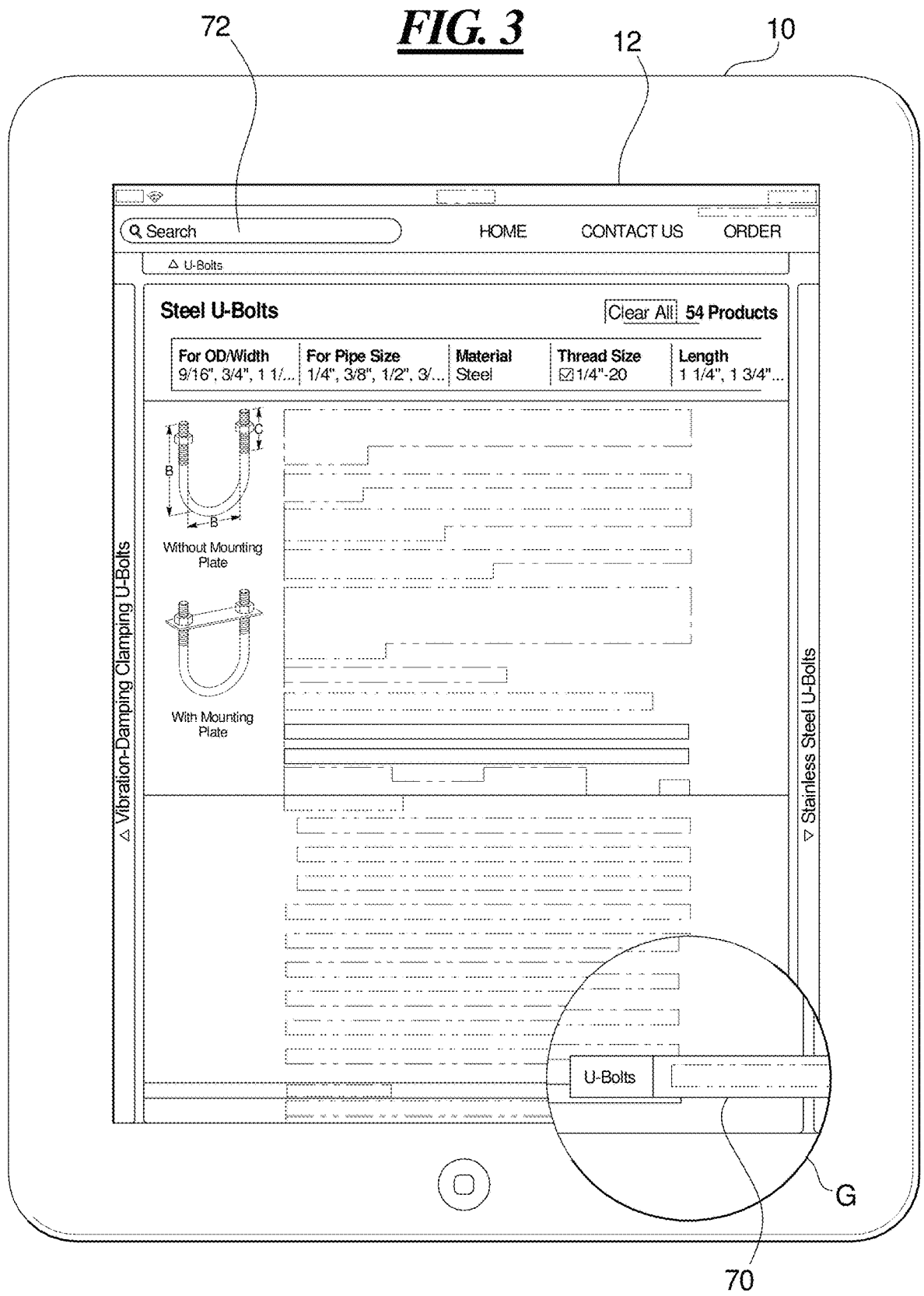
FIG. 3 is a screen shot of a user interface on a touch screen computer device showing a product information page of a catalog.

In FIG. 3, thumb-friendly controls 70 are available on the edges of display screen 12 so that the user can move right or left (or forward and backward) using gestures such as a pull, swipe, or tap. In addition, the user may input search terms at any time by tapping a search field 72 shown at the top of the display 12. Activation of the search field 72 opens a virtual keypad or keyboard (not shown) on the display 12 by which the user may input text for the search. The keypad may include a continuous keypad, such as across the bottom of the display, or may include a split keypad for text input by the user's thumbs while holding the tablet computer, for example. Other input means may be provided as well.

Figure 4:
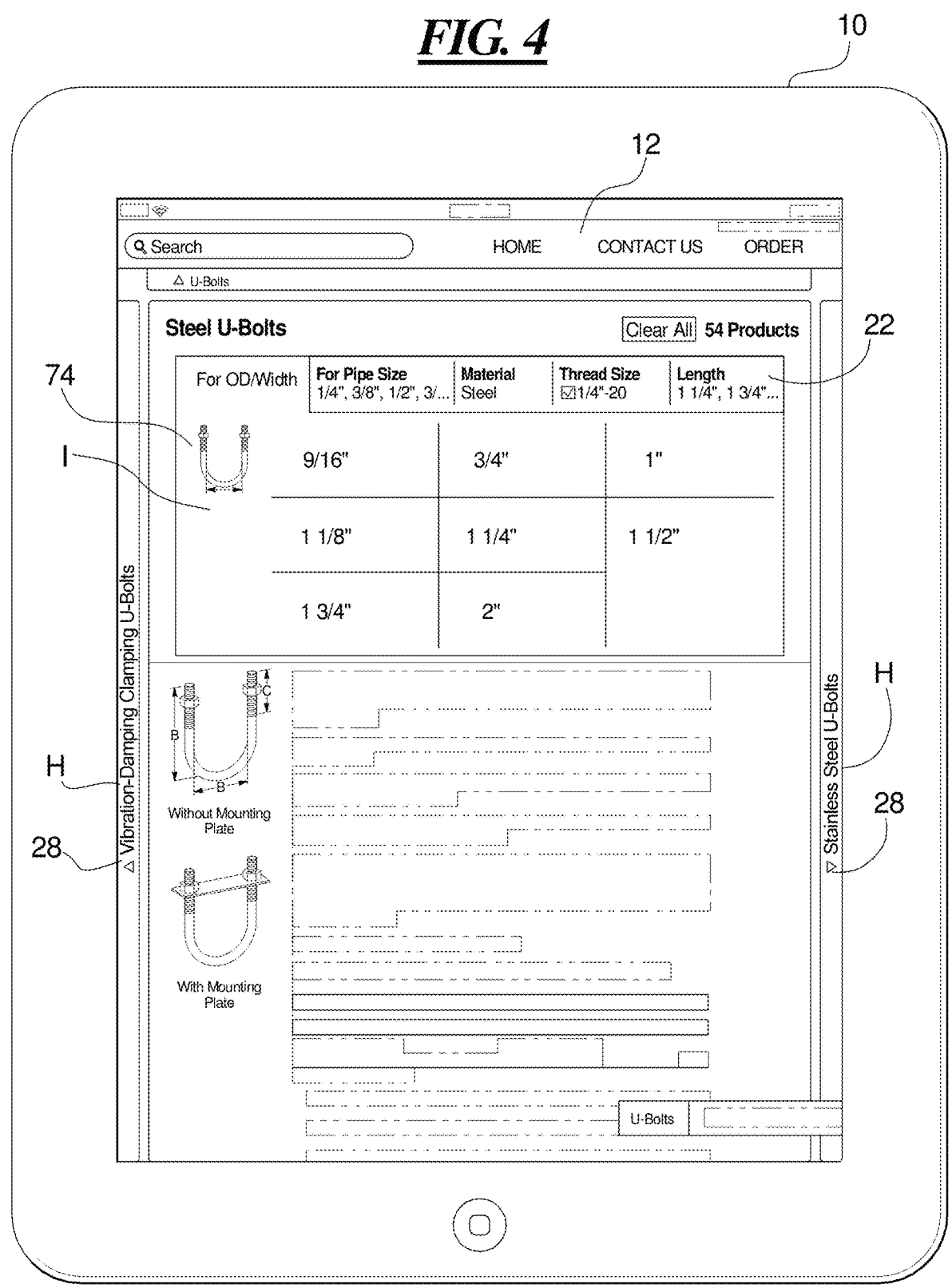
FIG. 4 is a screen shot of the user interface on a touch screen computer device showing product characteristics for the product.

FIG. 4 shows the display 12 of the mobile device 10. The user has selected an entry in the banner 22, which opens a drop-down box 74 showing a table of values that fall within the range specified in the banner item touched by the user. In particular, the banner 22 included a banner item indicating values for the outside diameter (OD) or width of the steel U-bolts that are available. See FIG. 1 for example. A text line in the banner item shows a partial listing of the widths available. By the user touching the banner item, the table 74 opens to show a complete listing of all width measurements of the available products. Each width measurement is allotted a cell in the table 74. By touching a table cell for a corresponding width, the user inputs that value to the mobile device, which in turn transmits the selected value to the servers to narrow the search. The banner 22 may include portions that extend off screen. To view the off-screen portions of the banner 22, the user may drag or swipe a finger across the visible portion of the banner 22 to move the off-screen portions onto the screen. Items on the off-screen portions of the banner 22 are made visible to the user and may be selected so as to open a drop-down box of values.

As noted above, the path indicators 28 may show closely related products, and may be products that are closely related to one another according to the product path and product search structure as determined according to the system and method. One or more algorithms for choosing which products are most closely related run on one or more of the servers that provide the information for the display screen. The information to be displayed may be provided to a website browser as a remote website. The one or more algorithms examine a database created by product experts with the user's prior input and the prior input of other users. The outcomes of the one or more algorithms determine the product classes to be provided on the display screen so that a gesture by the user will advance the user from a product group presentation to a set of products in a product family or to an individual product information screen. The one or more algorithms take into account specifications of the products, such as the product's material or size. Related products can be included or limited upon consideration of the user's input.

The search interactions such as the user input using selections from the drop downs tables 74 or other user input can be used in conjunction with the related products determination to reduce the set of products that may be presented to the user as relevant and included in the product path, for example. As the user proceeds through displayed screens and the search is advanced to one or more closely-related products, the user selections, when relevant, are preserved by the system and may be utilized in the future for this user or for other users.

Figure 5A:
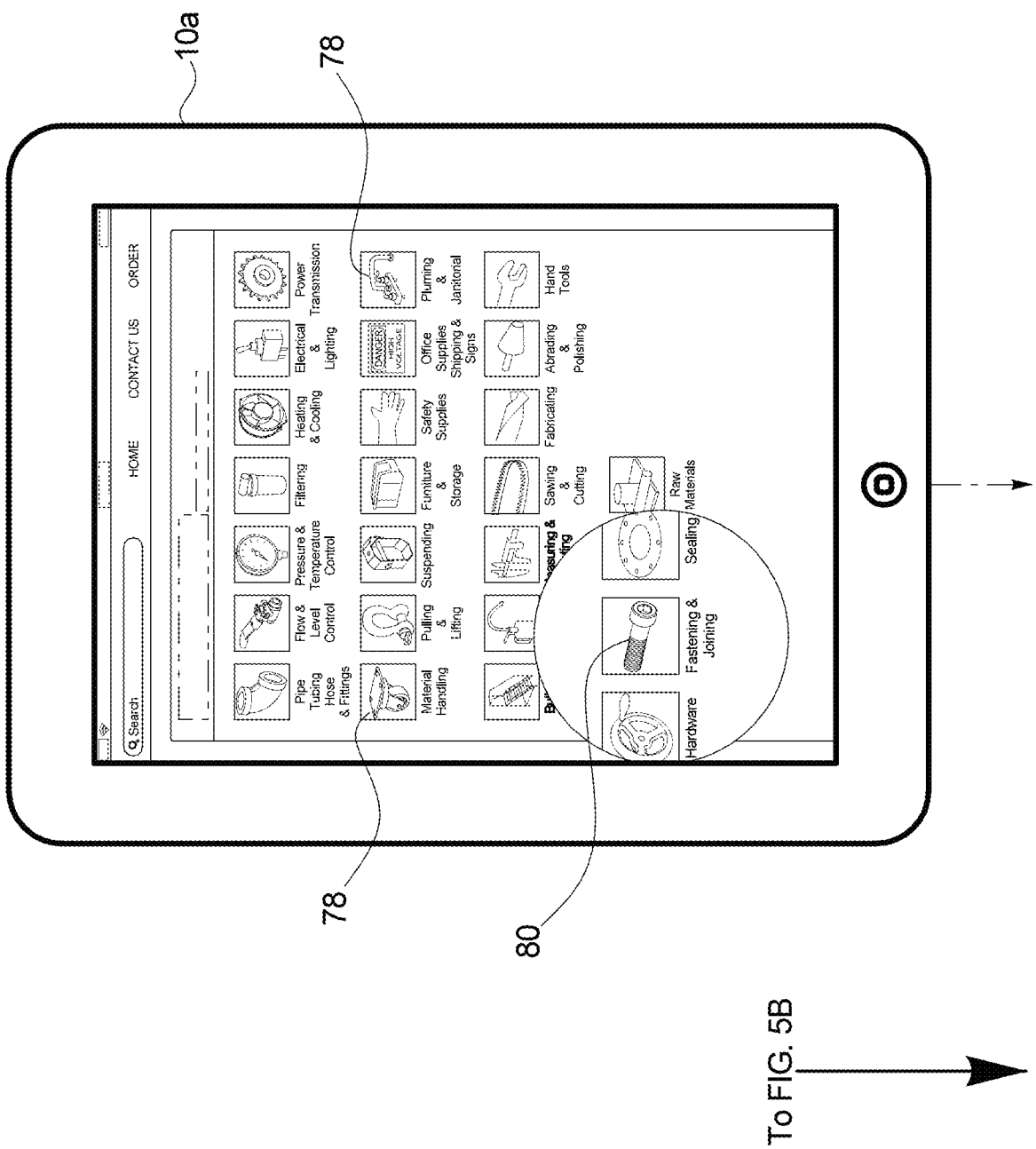

With reference now to FIGS. 5A, 5B, 5C, 5D, 5E, 5F and 5G, the tablet computer 10 is shown at 10a in FIG. 5A displaying images and descriptions 78 of broad classifications of products within the product catalog. Each broad product classification encompasses many products and is illustrated by an image of a representative product. The broad product classifications are selected by the system to provide a manageable number of classifications for the user to view. Here, the classifications and their illustrations or images fit onto a single page on the display screen and are sized for ready reading and recognition by the user. The illustrations and descriptions 78 may be referred to as icons.

The user selects one of the broad classifications of products by tapping the desired representative icon 80. Activating the icon 80 causes the application program running on the tablet computer 10 to retrieve detailed information about the selected product classification, as shown at 10b in FIG. 5B. In the illustrated example, the user has selected the classification of fastening and joining products. The display screen changes to show groups of fastening and joining products. The fastening and joining products information is retrieved by the computer device accessing a website server or other network site having the product catalog stored thereon. The catalog page shown at 10b in FIG. 5B includes illustrations of product sub-classifications and families that are within the broad classification selected by the user.

Figure 5C:
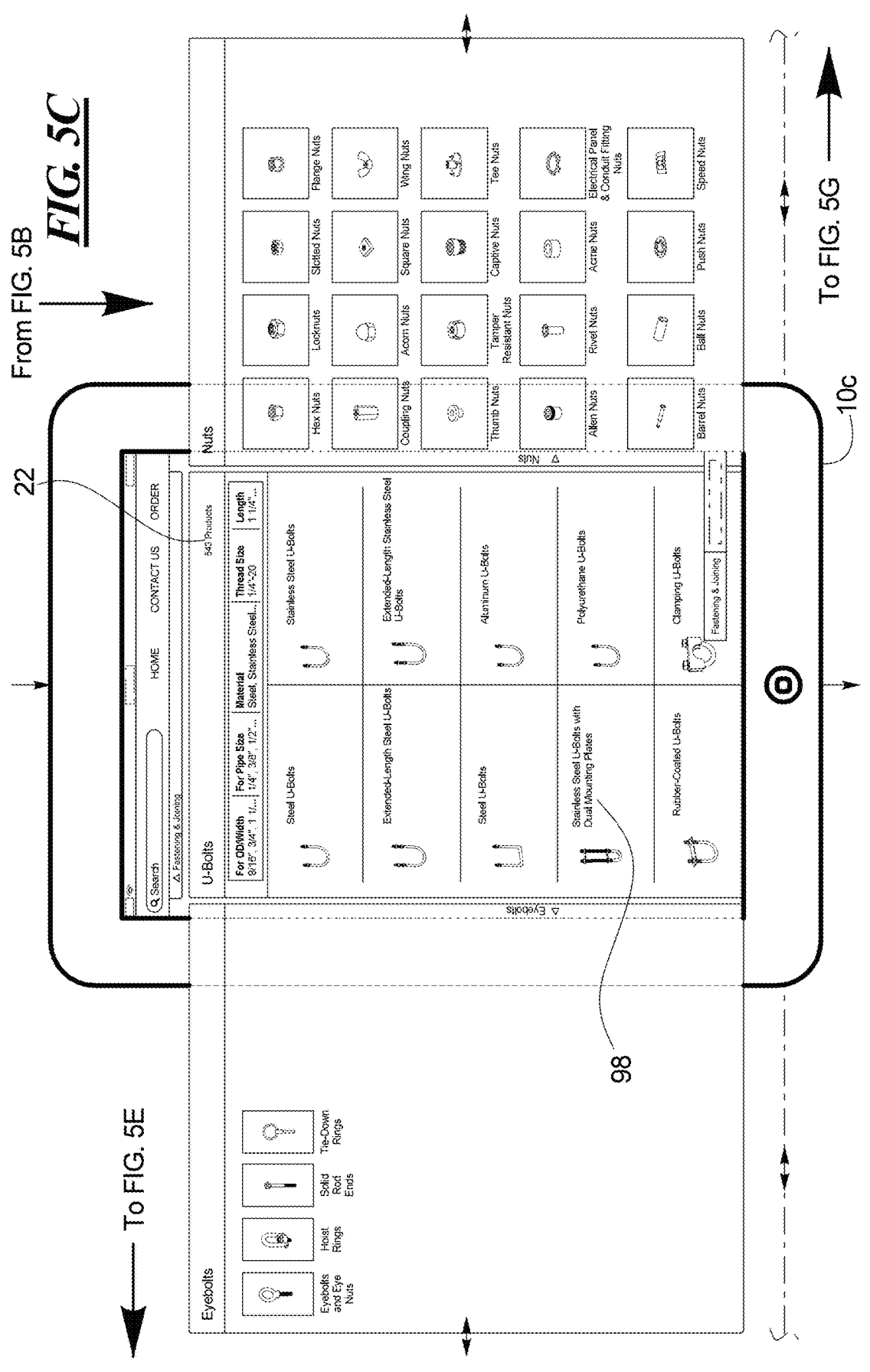
Figure 5D:
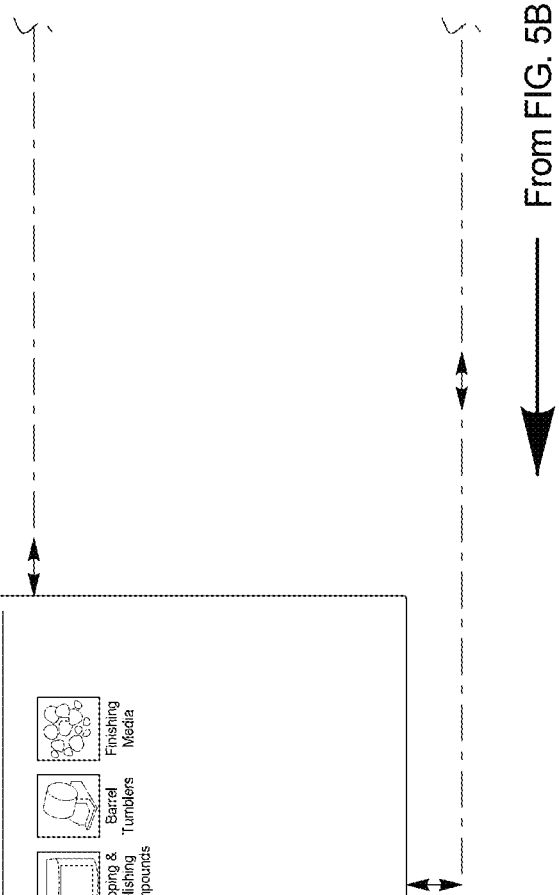

The broad classifications shown as icons that appear on the same page at the more general or higher search level 10a in FIG. 5A may be presented as separate pages or screens at the more detailed or lower search level when selected by the user. See, for example, FIGS. 5B, 5D, and 5F. The determination of the product path may result in including or eliminating broad classifications from the more detailed search level or the display pages may be determined to be more or less closely related for display as next screens. The plurality of broad classification pages or screens may be reviewed by the user using the horizontal swipe motion to move to next pages or screens. The user may move from one broad classification display screen to another by swiping either left or right. The path indicators or guides on the screen show a description of the next broad classification display screen that will appear with a left or right swipe by the user in accordance with the product path. In certain embodiments, the entire product catalog can be browsed at the broad classification level by the left and right swiping at this level of browsing. The pages loop to form a continuous pathway for horizontal browsing at the broad classification level as indicated in FIGS. 5B, 5D, and 5F.

In the illustrated example of FIG. 5B, broad classifications of products include, for example, fastening and joining 82, to the left of which is the hardware broad classification 84 and to the right of which is the sealing broad classification 86. Related broad classifications are shown on adjacent pages. Further swiping motions will reveal the abrading and polishing broad classification 88 to the far left as shown in FIG. 5D and the pipe, tubing, hose and fitting broad classification 90 to the far right as shown in FIG. 5F. The broad classifications loop back on themselves as indicated by the dotted line 92 so that if the user were to reach the far right classification of pipe, tubing, hose and fitting 90, and then make a further swipe from the right to the left, the abrading and polishing classification 88 would appear on the display screen of the mobile device 10.

Should the user desire to return to the previous level with all of the broad classifications on a single screen as shown in FIG. 5A at 10*a*, the user need only swipe up. The previous more general level is then shown on the display screen. The user may quickly access another broad classification by selecting a corresponding icon 78 from the more general screen without requiring the user to move through many screens at the more detailed level.

Within each broad classification are narrower classifications 94 arranged in a vertical arrangement for scrolled viewing by the user. Within each narrower classification 94 are shown families 96 of products represented by generic or representative illustrations and descriptions. The narrower classifications 94 and product families 96 may be determined by the product taxonomy. Classifications and product families included in the product path, particularly those determined to be next screens, may be determined dynamically from user input. The classifications and product families represent levels within the product search structure.

In an example, included within the fastening and joining broad classification are the narrower classifications of the fasteners classification and the adhesives and tape classification. Within the narrow classification of fasteners are product families for screws and bolts, threaded rods and studs, eyebolts, U-bolts, nuts, washers, shims, helical and threaded inserts, spacers and standoffs, pins, anchors, nails, nailers, rivets, rivet tools, staples, staplers, key stock, retaining rings, cable ties, lanyards, and magnets.

Each family 96 is illustrated by a generic or representative illustration showing characteristics that are common to many or most of the products within the family, or that evoke in the viewer an understanding of the product family. For example, the magnet family is illustrated by a U-shaped magnet—representing a common understanding of a magnet—although the magnets within this family may be of many different shapes.

Further illustrating the relationships, the hardware broad classification 84 includes the narrower classifications of machinery hardware and door and cabinet hardware-within which are families of products. The sealing broad classification 86 to the right includes no further breakdown into narrower classifications, but only shows the product families. Thus, where the product taxonomy determines that further classification is necessary for user understanding and searching, one or more narrower classifications are provided. On the other hand, where a broad classification has relatively fewer families or for other reasons, no further sub-classification is made.

The product taxonomy used for classification includes some classes with sub-classes and many families while others have few or no sub-classes some classes may have few families. The taxonomy information is stored and available to the server when providing the catalog information and product path information to the mobile device.

Figure 5F:
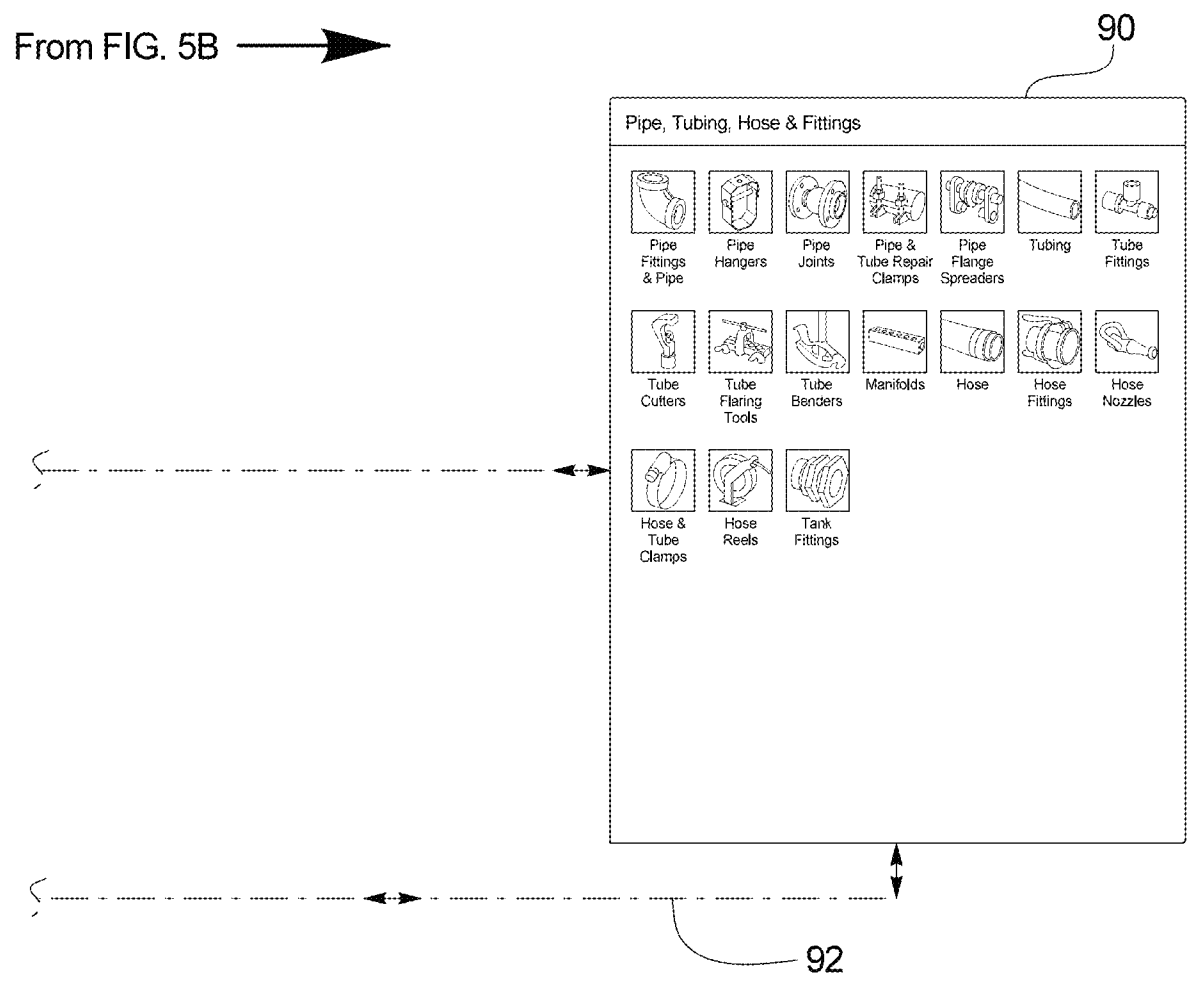

When the user selects a product family from the classification display, the mobile device sends a request to the server, which returns the next level or more detailed level of the search, as shown in FIG. 5C at 10*c*. This next deeper level of search includes the banner 22 with commonly selected product characteristics. Below the banner 22 are illustrations of product items 98 that are within the selected family. The product items 98 may include descriptive text. By selecting one of the product items 98, the display may show the items in the product catalog, or may show a next deeper level in the search.

By the user swiping to the left or right on the touch screen display, the display screen changes to show the next related items as determined by the product path. For example, the related items may be those shown on the same screen in the previous higher level. Horizontal swiping moves the displayed screen page by page through the families of the narrow classification as represented as icons at the higher level. Should the user desire to move to the higher level, the user need only swipe up and the next higher level is shown.

The product catalog may have as many levels as necessary to narrow the search to a manageable number of products for the user to view. Some broad classifications may include many levels while others may have fewer levels. In broad classifications with many sub-classifications and families, the classifications may be expanded in scope to reduce the number of levels through which a user must move to access product information.

Figure 5G:
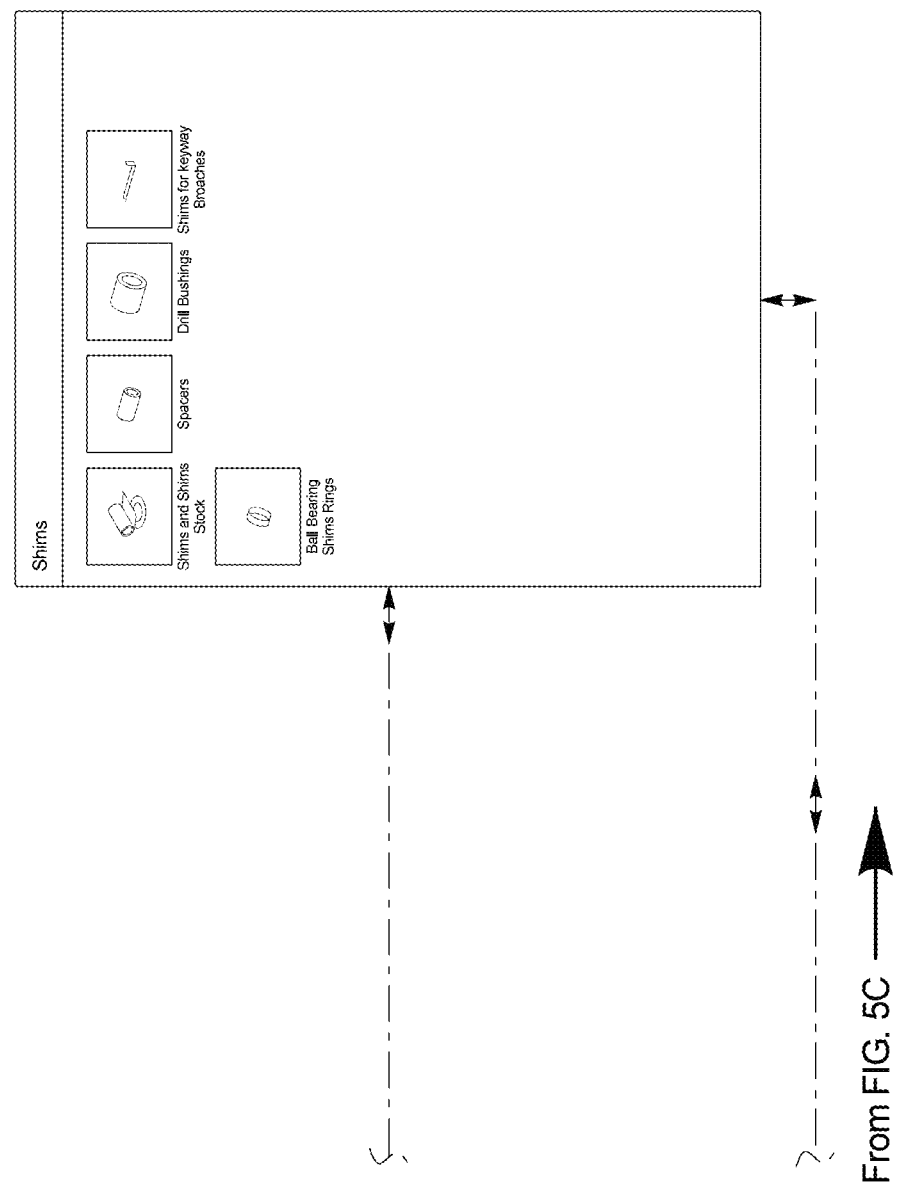

In the illustrated example, the user has selected U-bolts at level 10*b* as shown in FIG. 5B. The level 10*c* in FIG. 5C shows that the classification of U-bolts including steel U-bolts, stainless steel U-bolts, extended length U-bolts, etc. By selecting the entry for steel U-bolts, the display is changed to that shown in FIG. 1. A horizontal swipe motion by the user from the displayed screen moves the display to the related items of nuts and eyebolts as shown in FIG. 5C. Further swiping moves the display to screening as shown in FIGS. 5E and 5G. Thus, the related items as possible next screens do not remain constant but are changed by the system and method depending on user input history and other factors.

A significant feature of some embodiments of the invention is that the user is able to reach any product in the catalog from any page. By horizontal swipes, the user moves the displayed screen to other pages or screens within the catalog and will eventually reach a page with the desired product line. It does not matter which direction the user begins moving in, since all of the pages at a level are connected in a loop according to certain embodiments. This may be referred to as "around the world" browsing. For closely related products, for example as determined by the product path, the number of pages to traverse is few. For less related products, the number of pages is greater. For example, a user viewing a product page relating to scalpels can by swiping horizontally and moving page by page reach products in the heating and cooling category, although this will require movement of the display screen through very many pages. It is also possible, and preferable to many users, that the user moves the screen vertically between different levels within the product taxonomy to reach a branch having the desired product category, thereby reducing the number of gestures and screen changes required to reach less related products. The user input or the input of other uses may result in the less related products for some user being positioned as more related products on next or nearby pages.

The product path in either horizontal gesture direction and between different vertical gesture levels enables a user to traverse the entire product offering. The interface enables a user to advance through the product offering or catalog step-by-step. Gesture moving in the same direction, the user is eventually able to view the full breadth of available products in the catalog. It is envisioned in some embodiments that horizontal gesture browsing is limited to levels having classifications of products or to product groupings, whereas in other embodiments the horizontal gesture browsing moves may be used to move through the entire catalog including at the detailed product page level.

Figure 6:
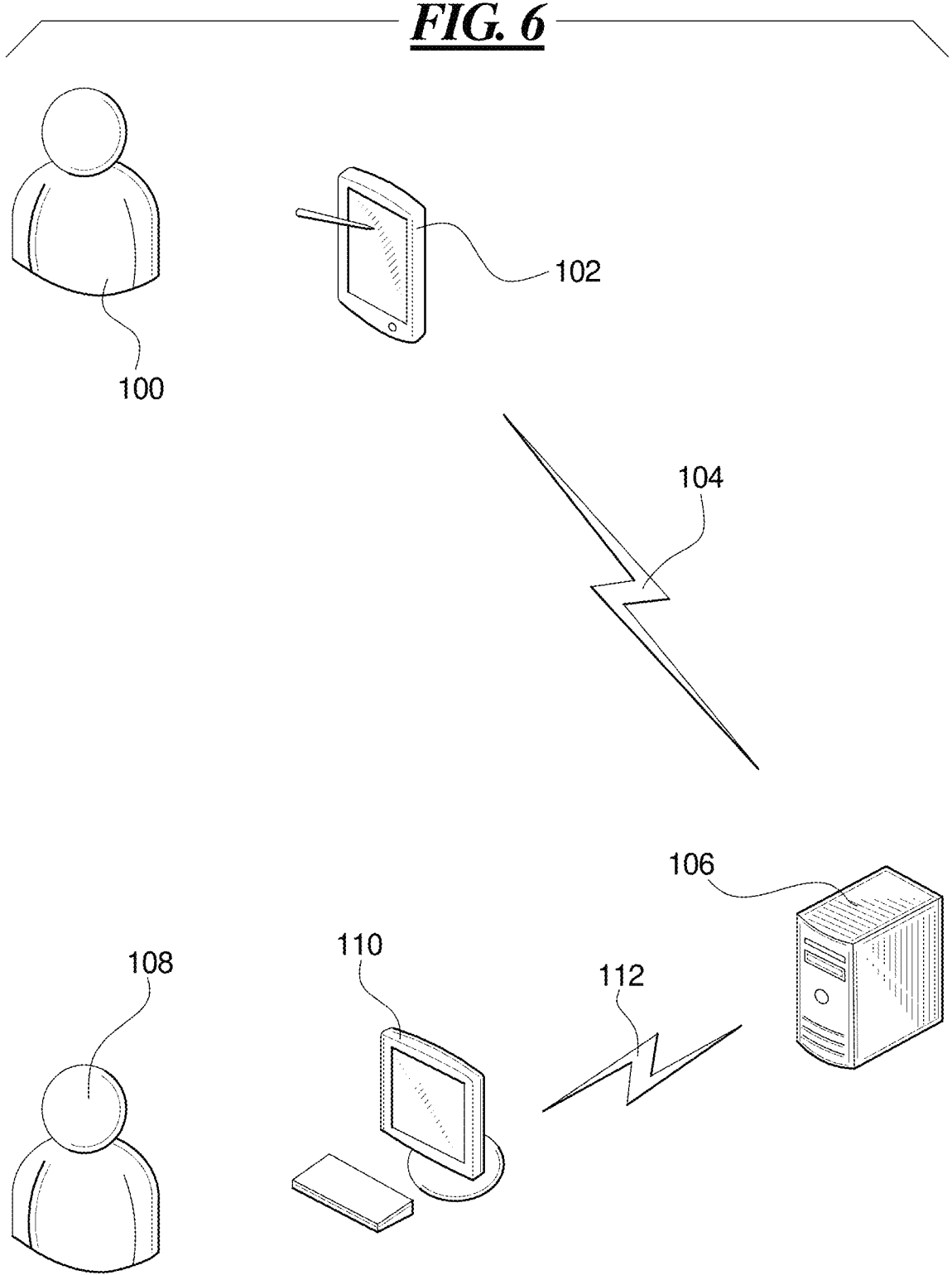
FIG. 6 is a schematic representation of a user accessing the catalog on a server using a portable device and a company representative programming the server to update the catalog.

An example of a system and communication channels according to the present method and apparatus is shown in FIG. 6. A user 100 is at a tablet computer 102 entering the search selections, tapping icons, swiping the touch screen, and reviewing the displayed results. The tablet computer 102 communicates over a communication link or channel 104 to one or more servers 106 where the catalog information is stored and the algorithms are executed for generating components of a display screen and contents of next screens to be displayed on the tablet computer 102. The stored information on the server 106 may include information obtained from the user's tablet computer 102 or from other users' computers, may be generated by the server 106 or other computer devices, or may be input by an administrator 108 or other person using a computer 110 having a communication link or channel 112 to the server 106. Other configurations are also possible. The elements shown here are examples only and do not limit the configuration of the system.

The mobile device and the server each include one or more processors and associated components that operate under the control of software stored on tangible, non-transient computer readable storage media to perform the steps of the methods and process disclosed herein. The server has access to data stored on computer readable media from which the server retrieves the stored data and to which the server forwards data for storage. The processors of the server and mobile device are programmed to operate as special purpose machines to carry out the method.

Figure 7:
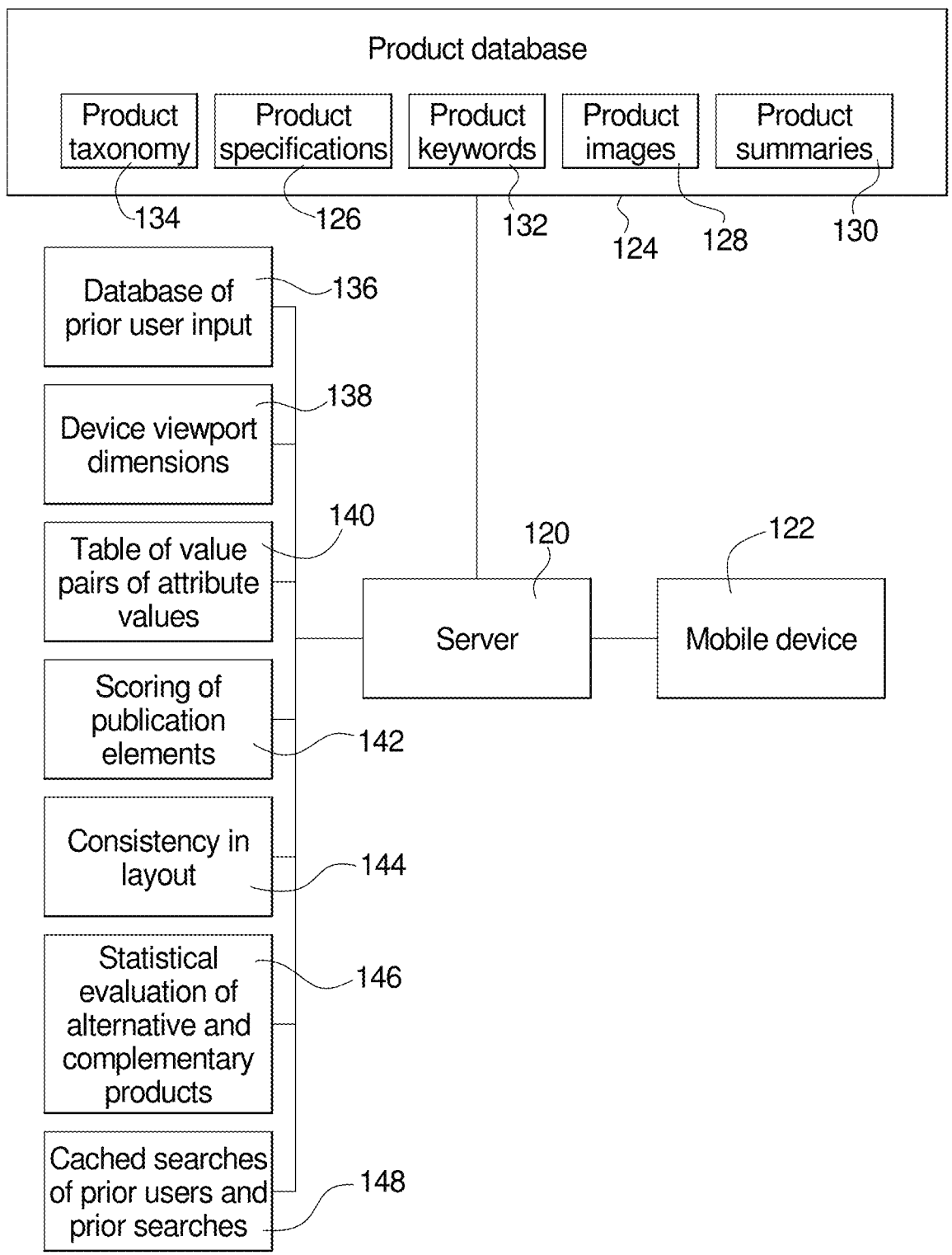
FIG. 7 is a block diagram showing functions and data accessed by the server in generating the product paths.

An example of a server configuration that may be used in accordance with the present invention is shown in FIG. 7. A server 120 communicates with a mobile device or user's computer 122 which may indicate many such devices connected to one or more servers. The server 120 has access to stored information including product listings 124 and product information display components. The product listings include product specifications 126 and product images 128 as well as product summaries 130. Product keywords 132 are provided for searching by the system when the user performs word searching.

In addition to product information, the server 120 has access to stored product taxonomy 134 which defines the relatedness of the products. A database 136 of prior user inputs has stored therein search path information and product viewing information by prior users or even by the current user, for example as obtained from other computer devices connected to the server 120 while performing product searches.

As the information embodying the product search structure is prepared by the server, the information may be formatted for easy viewing by the user. For this reason, the server polls the mobile device 122 or other computer device for information to determine the size and resolution of the display device. This information may include model information or the like for the computer model. The server 120 uses this information to determine the viewport or display screen dimensions of the device from information 138 stored for access by the server.

Attributes of products are given different values relating to their effectiveness at guiding the search by a user. These attributes and their paired values are stored at 140 for use in the search process by the server 120. The attributes and their values may comprise the product path.

Elements to be presented on the display screen are scored for their effectiveness in conveying information to the user. This scoring is stored at 142. While scored elements may have a higher value, it is also important in displaying the search results that the display is consistent from screen to screen, at least within a search by the user. As such, a function 144 evaluates the consistency of the layouts being viewed by the user and makes determinations based on consistency that may weigh against other factors.

A statistical evaluation of alternative and complementary products is performed by a function 146. The output of this function is used in determining which screens should be shown in adjacent, horizontal swipe displays, or next screens. Expert input may be initially used to aid in the determination of the next screens function, but as more data is collected a greater reliance may be made on the automated collection of data and the statistical evaluation thereof for determining product paths and next screens.

The system stores prior user searches and prior search paths or product paths in a cache 148, which is reviewed to evaluate and determine which display screens to show next and what information is to be shown on the displayed screen. The cache may store hours, days, weeks, or months of recent searches for evaluation and for use in guiding searches of current users.

Figure 8:
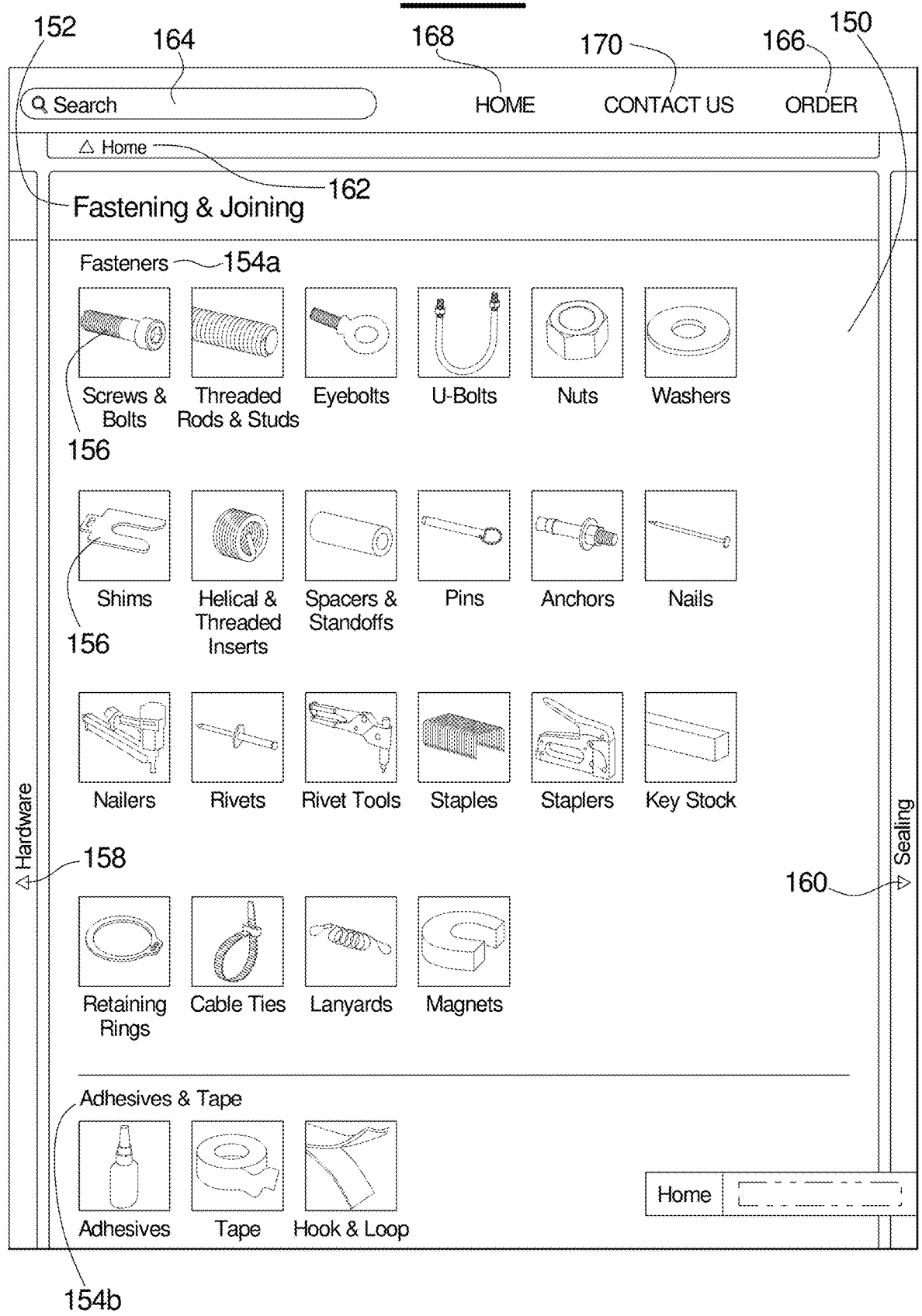
FIG. 8 is a screen shot of a computer device showing broad classifications, narrower classifications and families of products in a product catalog.

Turning to FIG. 8, a display screen 150 is shown at a category level of catalog browsing. The display 150 shows a broad category 152 of fastening and joining across the top of the display. Within the broad category 152 are narrower categories 154, or more detailed levels, which are shown here as fasteners 154a and adhesives and tape 154b. The narrower categories are in turn divided into product classes, or still more detailed levels, each indicated by an icon and a text description 156. Within the narrow category of fasteners 154a are product classes 156, each indicated by an icon and a brief text description. For example, the product classes are screws and bolts, threaded rods and studs, eyebolts, U-bolts, nuts, washers, shims, helical and threaded inserts, spacers and standoffs, pins, anchors, nails, nailers, rivets, rivet tools, staples, staplers, key stock, retaining rings, cable ties, lanyards, and magnets. By selecting any one of these icons, the user will be shown a page at a deeper or more detailed level in the catalog structure. The deeper level may be U-bolts, for example.

The user may move through the broad category level as shown in FIG. 8 by horizontal gesture browsing. For example, a swipe to the left opens the broad category or classification of hardware as indicated by the path indicator 158. A swipe to the right opens the broad category or classification of sealing, as indicated by the path indicator 160. Using horizontal gesturing, the user may move through the entire catalog at the broad category level. Vertical gesturing such as an upward swipe as indicated by the path indicator 162 returns the display to the home page, or top level. Vertical gesturing to reveal display screens or pages at the deeper levels is performed by tapping on any of the displayed icons to enter a deeper level of the catalog. At this deeper level, the user may use horizontal gesturing to move about that level or use vertical gesturing to move to a different level. A search field 164 is provided to enable the user to enter search terms. The results of the search may take the user to different levels within the catalog. An order command 166 is provided to permit the user to order items selected by the user as the user browses the catalog. A home command 168 enables the user to move quickly to the home screen even if deep in the catalog structure. A contact us command 170 enables a user to contact the company for questions about the catalog or products.

Figure 9:
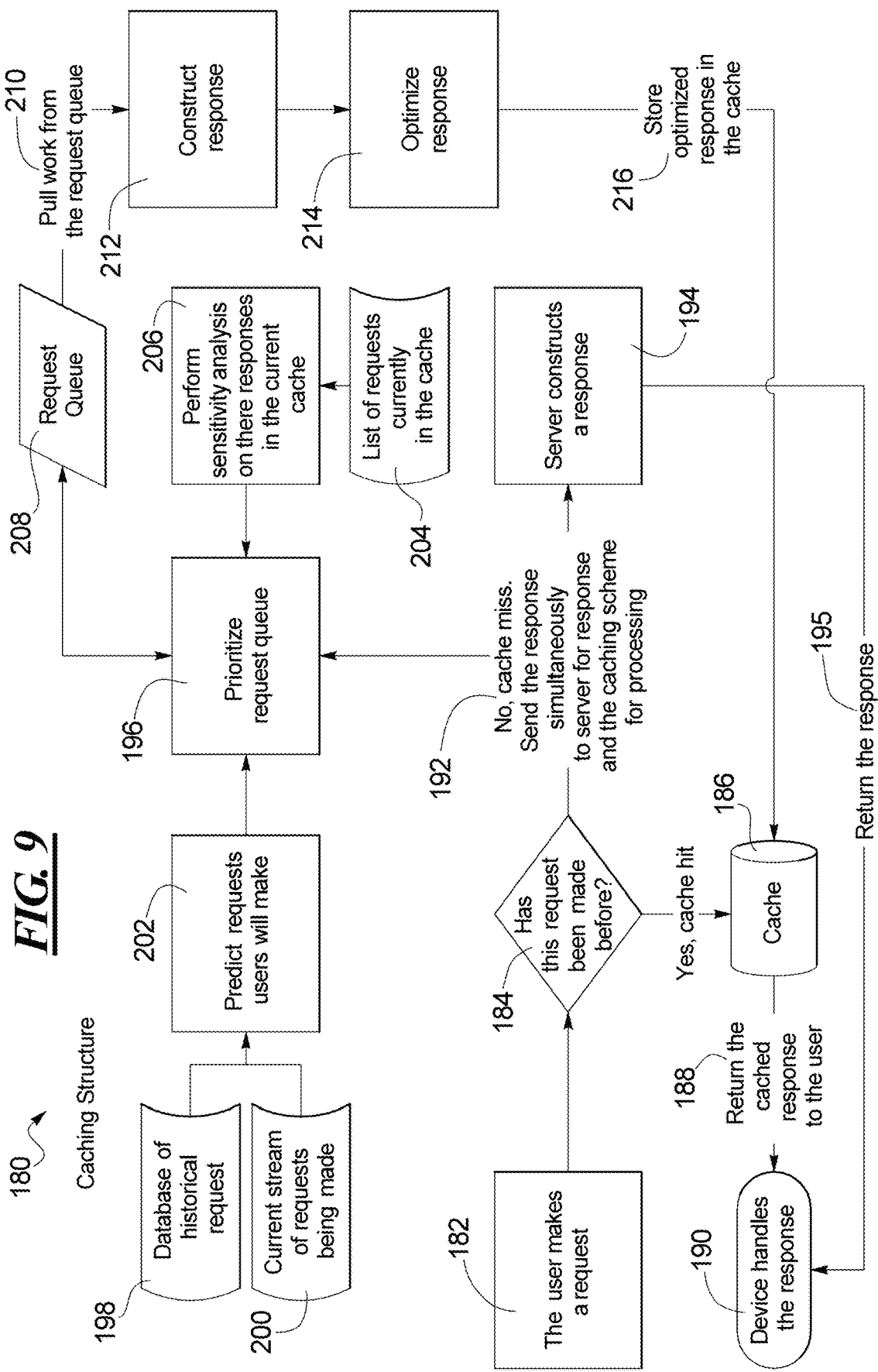
FIG. 9 is a flow chart of a caching process used in the present method and system.

In FIG. 9, a caching structure 180 is provided. The caching structure 180 is utilized when a user makes a request or inputs a search or command at block 182. The inquiry is made as to whether the user has made this request or entered the search string or the command before, at block 184. If the answer is yes, the inquiry is classified as a cache hit and accesses a cache 186. The cached response is returned to the user, at 188, which causes the user's computer device to handle the response, at 190. If the inquiry has not been made before, the determination 184 moves to block 192, identified as a cache miss. A response is sent simultaneously to the server for response and to the caching scheme for processing. The server constructs a response at 194, for example using the method and system described herein. The constructed response is provided to the user's computer device for display as indicated at 195. The inquiry is also sent to a block 196 to prioritize the request queue. Information is drawn from a database of historical requests 198 and a current stream of requests being made 200. These pull information from other users. A prediction is made of the requests that the users will make at 202. The prediction is sent to the block 196. Information is also pulled from a list of requests currently in the cache at 204, which provides information to a function that performs sensitivity analysis on the responses in the current cache at 206. The output of the sensitivity analysis 206 is also provided to the prioritizing block 196. The output of the prioritizing block 196 is provided to a request queue command 208. As a result of prioritizing the requests in the queue, work is pulled from the request queue at 210. A response is constructed at 212. The response is optimized at 214, and the optimized response is stored in the cache as indicated at 216. The optimized response is thus included in the cache 186.

By caching the inquiries of the current user as well as by caching the responses to other current and past users, the product path may be constructed and transmitted to the user's computer device, which results in a product search structure and product paths that respond to the user's mobile computer device more quickly and presents information that is more relevant to the user. The system becomes increasingly able to more accurately respond to the user. By utilizing the current stream of requests in the caching inquiry, up-to-date information on new searches being performed by users is accommodated. For instance, a change in some circumstance may result in a search for a particular product or class of products becoming in demand. The cached searches and comparison to current searches enables the system to recognize this changing trend and dynamically change product search structures and product paths that accommodate rapid searching for the desired products by the users.

The present method and apparatus may be used for searching through large volumes of information, whether it is product catalogs or other information. The scope of the invention encompasses searching using the methods and systems disclosed herein regardless of the items being searched or the source of the listed items.

Although other modifications and changes may be suggested by those skilled in the art, it is the intention of the inventors to embody within the patent warranted hereon all changes and modifications as reasonably and properly come within the scope of their contribution to the art.

We claim:

1. A method for displaying information, comprising:
  displaying first information on a display of a computer device;
  receiving a user input from a user of the computer device;
  receiving a prediction of a selection by the user of second information as a predicted user selection based on the received user input, the predicted user selection including complementary information to the first information;
  preloading the second information into the computer device based on the predicted user selection, the preloading of the second information being performed prior to selection of the second information by the user; and
  indicating the preloaded second information to the user on the display of the computer device, the indicating including displaying indicators on the display of the computer device, the indicators including labels identifying the second information.

2. A method as claimed in claim 1, further comprising:
  receiving a second user input on the computer device as a user selection of the indicated second information; and
  displaying the preloaded second information on the computer device after receiving the user selection of the second information.

3. A method as claimed in claim 1, wherein the prediction is generated based on learned path information.

4. A method as claimed in claim 3, wherein the learned path information is from at least one of searches and selections by the user.

5. A method as claimed in claim 3, wherein the learned path information is from at least one of searches and selections by other users.

6. A method as claimed in claim 1, wherein the user input is a selection.

7. A method as claimed in claim 6, wherein the prediction of the selection by the user of the second information is based on related information to information identified by the user input, the second information being related information to the first information as complementary and alternative information, the complementary information being obtained by statistical evaluation of alternative and complementary products to the information identified by the user input.

8. A method as claimed in claim 1, wherein the layout of the preloaded second information is determined based on the size and resolution of the display of the computer device.

9. A method as claimed in claim 1, wherein the prediction of the second information is based on alternative, complementary and related information to the first information as determined by statistics of searches by users.

10. A method as claimed in claim 1, wherein the prediction is based on the user's prior input and prior input of other users.

11. A method as claimed in claim 1, wherein the indicators are direction indicators that are operable to display the second information upon being selected by the user, the direction indicators being disposed at edges of the display of the computer device, and wherein the labels identify the second information upon operation of the direction indicators.

12. A method as claimed in claim 1, wherein the receiving of the prediction of the selection by the user includes receiving the prediction from a server, the prediction being based on statistical analysis of a plurality of user inputs received by the server via a plurality of computer devices.

13. A method as claimed in claim 12, wherein the plurality of user inputs includes inputs received via at least one of a computer device running an app or a computer device accessing a website via a website browser.

14. A method as claimed in claim 12, wherein the plurality of user inputs include a user input received via a computer device running an app and a user input received via a computer device accessing a website via a website browser.

15. A method for displaying information, comprising:
- displaying first information on a display of a computer device;
- receiving a user input from a user of the computer device;
- receiving a prediction of a selection by the user of second information as predicted second information based on the received user input, the prediction of the selection by the user including information on alternative and complementary products to the received user input, the alternative and complementary products being obtained by statistical analysis of user inputs;
- indicating path information to the predicted second information to the user on the display of the computer device prior to receiving selection of the second information by the user, the indicating path information including displaying labels for the alternative and complementary products; and
- displaying the second information on the computer device after receiving the user selection of the second information.

16. A method as claimed in claim 15, further comprising:
- preloading the predicted second information into the computer device prior to the user selection of the second information.

17. A method as claimed in claim 15, wherein the receiving of the prediction includes receiving the prediction by the computer device from a server, the server basing the prediction on statistical analysis of inputs received by the server from a plurality of users via a plurality of computers.

18. A method as claimed in claim 17, wherein the inputs from the plurality of users includes inputs received via at least one of a computer device running an app or a computer device accessing a website via a website browser.

19. A method as claimed in claim 17, wherein the plurality of user inputs include a user input via a computer device running an app and a user input via a computer device accessing a website via a website browser.

20. A system for searching stored information, comprising:
- a computer device connected to a server, the computer device having a processor programmed to execute a program, wherein the programmed computer device performs the steps of:
- receiving a user input on the computer device;
- receiving a prediction from the server of a predicted path based on the user input at the computer device and based on historical selections of information in the stored information received by the server, the prediction including alternative and complementary products based on statistical analysis of the historical selections;
- preloading information into the computer device based on the predicted path;
- displaying a path indicator of the predicted path on the display of the computer device;
- receiving a user selection of the displayed path indicator on the computer device; and
- displaying the preloaded information on the display of the computer device in response to the user selection of the displayed path indicator.

21. A system as claimed in claim 20, wherein the prediction is based on historical selections of the user.

22. A system as claimed in claim 20, wherein the prediction is based on statistical analysis of historical selections of other users.

23. A system as claimed in claim 20, wherein the predicted path predicts at least one of a classification and a family and individual information.

24. A system as claimed in claim 20, wherein the server is configured to generate the predictions based on statistical analysis of user inputs of a plurality of users received by the server via a plurality of computers.

25. A system as claimed in claim 24, wherein the user inputs of the plurality of users includes inputs received via at least one of a computer device running an app or a computer device accessing a website via a website browser.

26. A system as claimed in claim 24, wherein the user inputs of the plurality of users include a user input received via a computer device running an app and a user input received via a computer device accessing a website via a website browser.

27. A system for searching stored information, comprising:
- a server having a processor programmed to execute a program, the server being configured for connection to a computer device, the server being configured to receive user inputs to the computer device, the server being programmed to generate predicted paths based on the user inputs, the server being programmed to perform the method of:
- receiving a user input on the server via the computer device;
- predicting a path as a predicted path based on the user input and based on statistical analysis of historical selections of information in the stored information, the predicted path including alternative and complementary information;
- outputting a path indicator of the predicted path to the computer device for display on the computer device;
- receiving a user selection of the displayed path indicator at the server via the computer device; and
- outputting information indicated by the selected displayed path indictor to the computer device for display on the computer device in response to the user selection of the displayed path indicator of the predicted path.

28. A system as claimed in claim 27, further comprising:
- outputting the information of the predicted path to the computer device for preloading into the computer device prior to the computer device receiving the user selection of the displayed path indicator.

29. A system as claimed in claim 27, wherein the computer device is a first computer device, wherein the user input is a first user input from a first user, and wherein the server is configured to connection to a second computer device, the server being configured to receive a second user input from a second user via the second computer device, the server being programmed to perform the method of:
- receiving the second user input via the second computer device;
- predicting a second path as a second predicted path based on the second user input and based on the first user input from the first user, the predicted second path including complementary second information;
- outputting a second path indicator of the second predicted path to the second computer device for display on the second computer device;
- receiving a second user selection of the second path indicator at the server via the second computer device; and
- outputting second information indicated by the selected second path indicator to the second computer device in response to the second user selection of the displayed second path indicator of the second predicted path.

30. A system as claimed in claim 29, wherein the server is configured to receive user inputs from apps running on the first and second computer devices.

31. A system as claimed in claim 29, wherein the server is configured to receive user inputs from website browsers running on the first and second computer devices.

32. A system as claimed in claim 29, wherein the server is configured for receiving first user inputs from one of an app running on the first computer device or from a website browser running on the first computer device and for receiving second user inputs from one of a website browser running on the second computer device or an app running on the second computer device.

33. A method for displaying information, comprising:
receiving a request from a computer device for first information, the request being received at a server;
forwarding the first information from the server to the computer device for display to a first user; and
forwarding path information for second information from the server to the computer device for display on the computer device, the path information for the second information being predicted path information based on the received request for first information and learned from at least one of prior user inputs from the first user or prior inputs from second users, the predicted path information including second information that is complementary to the first information, the predicted path information being based on statistical analysis of the prior inputs of the second users.

34. A method as claimed in claim 33, wherein the predicted path information for the second information is forwarded for display on the computer device while the first information is displayed on the computer device.

35. A method as claimed in claim 33, further comprising:
receiving a request from the computer device for the second information, the request for the second information being received as a result of selection of the predicted path information for the second information by a user of the computer device;
forwarding the second information for display on the computer device; and
forwarding path information for further information for display on the computer device with the second information, the path information for the further information being predicted based on the second information and at least one of prior user inputs from the first user or prior inputs from second users.

36. A method as claimed in claim 33, further comprising:
receiving a plurality of user inputs from the first user; and
generating the predicted path information to the second information using the plurality of user inputs from the first user.

37. A method as claimed in claim 33, further comprising:
receiving user inputs from a plurality of the second users; and
identifying user inputs of the second users that are similar to the user input of the first user; and
generating the predicted path information learned from the user inputs by the similar second users, the predicted path information being based on statistical analysis of the inputs of the second users.

38. A method as claimed in claim 37, wherein the generating of the predicted path information includes accessing a stored database defining relatedness of information, the stored database including search path information and viewing information by second users using second computer devices to perform information searches, the generating of the predicted path information including performing statistical analysis of the search path information and the viewing information by the second users.

39. A method as claimed in claim 37, wherein the user inputs from the second users are received from a plurality of second computers operated by a plurality of second users.

40. A method as claimed in claim 33, wherein the receiving the request is received from one of a tablet computer, a laptop computer, a desktop computer, or a mobile telephone.

41. A method as claimed in claim 33, further comprising:
forwarding the second information to the computer device prior to receiving a request from the computer device for the second information.

* * * * *